(No Model.)
L. MAICHE.
APPARATUS FOR STERILIZING WATER.
No. 597,994. Patented Jan. 25, 1898.
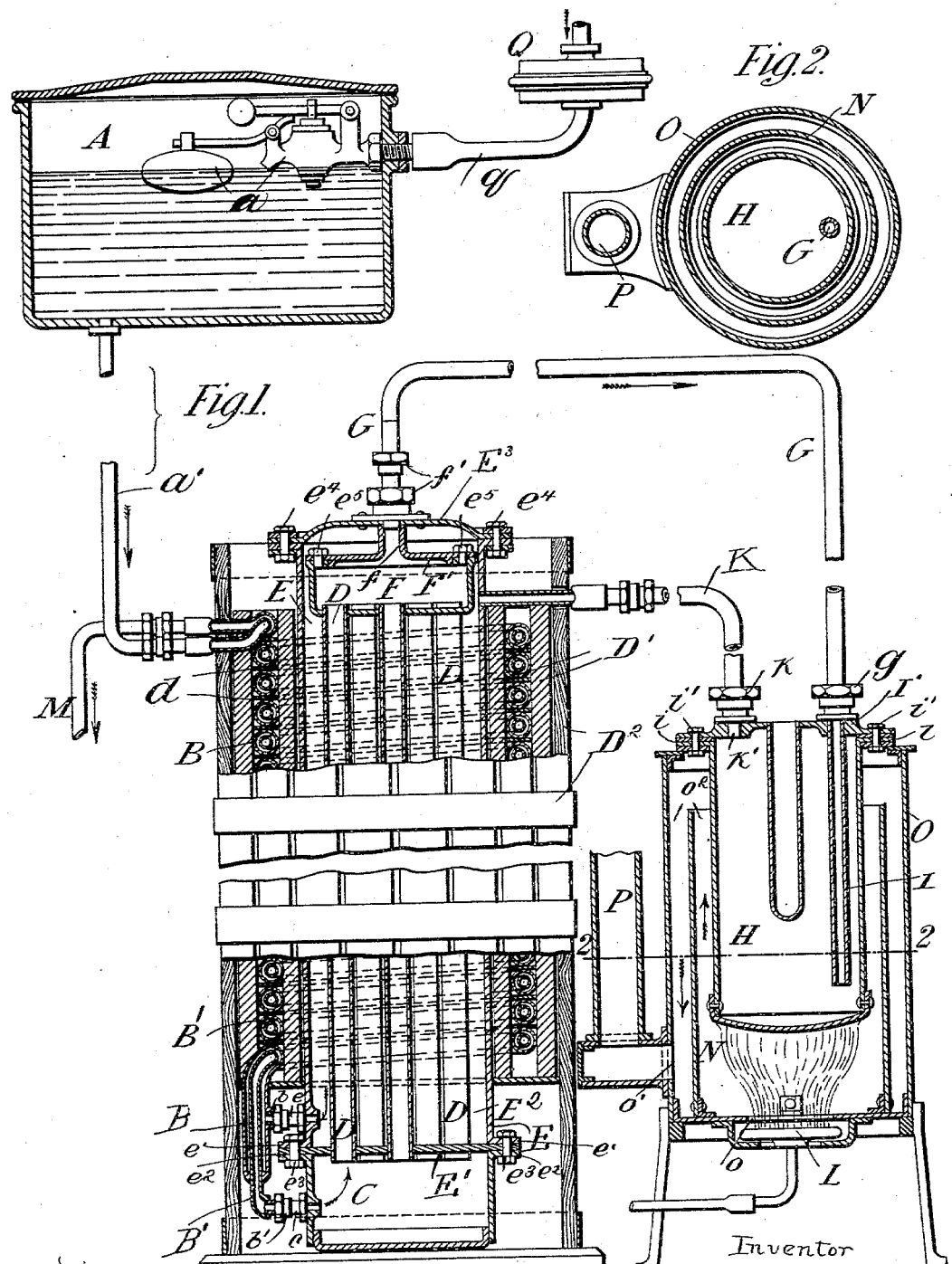
Witnesses
Inventor
Louis Maiche
James L. Norris
Attorney

UNITED STATES PATENT OFFICE.

LOUIS MAICHE, OF PARIS, FRANCE.

APPARATUS FOR STERILIZING WATER.

SPECIFICATION forming part of Letters Patent No. 597,994, dated January 25, 1898.

Application filed April 19, 1897. Serial No. 632,889. (No model.)

*To all whom it may concern:*

Be it known that I, LOUIS MAICHE, a citizen of France, residing at 368 Rue St. Honoré, Paris, France, have invented certain new or Improved Apparatus for Sterilizing Water, of which the following is a specification.

This invention relates to an apparatus for sterilizing water by heating it to a sufficient temperature to kill the bicilli therein and subsequently cooling it, the entire process being conducted in closed vessels and the water being maintained under pressure, so that the cooled water contains in solution all the gases which it had originally.

The construction and arrangement of the apparatus will be understood by reference to the accompanying drawings, in which—

Figure 1 is a vertical sectional view, and Fig. 2 a sectional plan view taken on the line 2 2 of Fig. 1.

The water to be sterilized may first be passed through a filter Q, if thought desirable, and is then conducted through a pipe $q$ into a suitable tank A, which is located a considerable distance—say thirty feet—above the sterilizing apparatus to give the necessary head to the water. Said tank is provided at its inlet-port with a float-valve $a$, which may be of the well-known construction, and operates to maintain a constant level of water in the tank. Where the apparatus is designed to be connected with the service-pipe of the house, it is obvious the tank A may be dispensed with. A pipe $a'$ connects the tank with the smaller of two concentric coils of pipe B B′, the smaller of which, B′, is located within the larger, B. The lower end of said smaller pipe B′ is removably connected, as by a nut $b'$, to the inlet-pipe $c$ of a chamber C. A series of vertical tubes D, arranged within a casing E, preferably in the form of a cylinder, connects said chamber C with a second chamber F, into which the upper ends of said tubes open. The lower end portion of the casing E is divided by a partition E′ to form the chamber C and the chamber $E^2$, which chambers are non-communicating. The larger pipe-coil B is removably connected, as by a nut $b$, to the inlet-pipe $e$ of the chamber $E^2$. Thus the chamber $E^2$ communicates with the larger pipe-coil B, and the chamber C communicates with the smaller pipe-coil B′. The bottom of the chamber F and the partition E′ are suitably apertured to receive the ends of the tubes D, which are thereby supported within the casing E. Said casing E is formed in two parts removably connected, said parts at their meeting edges having outward-extending flanges $e'$ $e^2$, which support between them the outer edge of the partition E′. Said flanges and partitions are suitably apertured to receive the bolts $e^3$. At its top the casing E is provided with a cover $E^3$, and the casing and cover have outward-extending flanges which are suitably apertured to receive the bolts $e^4$. The chamber F is provided with a cover F′, which is removably secured to said chamber by means of bolts $e^5$. The cover F′ has an upward-extending cylindrical projection $f$, the upper end of which bears against the under side of the cover $E^3$ and the opening in which registers with an opening in said cover. The opening in the cover and the passage through the projection $f$ form an inlet-port in which is removably secured, as by nuts $f'$, one end of a supply-pipe G, which extends into a heating vessel H, to be presently described.

In the preferred construction of my device the coils of pipe B B′ are adapted to surround the casing E; but to prevent heat being communicated therefrom to the pipes said coils are inclosed between walls of suitable non-conducting material D′, and non-conducting material $d$ is interposed between the convolutions of the larger pipe-coil. The parts of the apparatus described—that is, the vertical tubes, the casing E, and the pipe-coils B B′, with the surrounding non-conducting material—are preferably inclosed and supported within a wooden or other suitable jacket or casing $D^2$.

The heating apparatus H is shown to the right in Fig. 1, and comprises an outer cylindrical casing O, open at the top, and which at its bottom is provided with an opening $o$, to admit a burner L of any preferred construction and at its side with an opening $o'$ which forms an exit-port for the products of combustion to the chimney P. A cylindrical vessel I, having an outward-extending flange $i$, extends down into the casing O, its bottom being located at a proper distance above the burner L and is removably supported in said casing by means of the flange $i$, which rests upon a suitable flanged support carried by the casing. A cover I' is removably secured to the vessel H by means of bolts $i'$, which pass through suitable apertures provided near the outer edge of said cover and in the flanges $i$. The vessel H, with its outward-extending flange $i$, thus serves as a cover for the outer casing O. Removably secured to the bottom of the casing O and extending upward to a point near the top of the latter is a cylinder N, open at the top. Said cylinder surrounds the vessel H, its wall extending midway between said vessel and the casing O, as shown, to form a tortuous passage $o^2$ for the products of combustion.

The supply-pipe G extends through an opening in the cover I' to a point near the bottom of the vessel H and is removably supported therein by means of a nut $g$. An outlet-pipe K, which is removably secured, as by a nut $k$, to an outlet-opening $k'$ in the cover I', extends into the casing E and thereby connects the interior of the casing E with the interior of the vessel H.

The operation of the apparatus described is as follows: Water from tank A passes through the pipe $a'$ into the smaller pipe-coil B', through which it circulates and passes through the inlet-pipe $c$ into the chamber C. Thence it passes upward through the vertical tubes D into the chamber F and out through the pipe G and is discharged at or near the bottom of the vessel H. Here the water is thoroughly heated and sterilized. From the upper part of the vessel H the heated water passes through the opening $k'$ and is conducted by the pipe K to the interior of the casing E, where the water surrounds the vertical tubes D and heats the water contained therein or flowing through the same. From the lower end of the casing E the water passes through the outlet-pipe $e$ into the larger pipe-coil B, through which it circulates, surrounding the smaller pipe-coil B' and imparting its heat to the incoming water flowing through said smaller pipe-coil in the opposite direction and conjointly being itself cooled, being finally drawn off from the outlet-pipe M at a sufficiently low temperature to be pallatable as drinking-water.

It will be observed that the apparatus described is continuous-acting in its operation, the water flowing continuously through the pipes and vessels adapted to contain it and being maintained therein under constant pressure, so that the water loses none of its contained gases, but issues from the apparatus full of "life" and not in a "flat" condition, as would be the case were the water boiled at ordinary atmospheric pressure.

It is also to be noted that the parts of my apparatus in which the temperature may reach a point at which deposits may form are all removably connected, so that they may be readily separated when it is desired to remove the deposits which form therein during the process of sterilization.

In an apparatus of this character, especially where it is designed for domestic use, a great desideratum is the conservation of the heat energy and the most perfect exchange of heat between the outgoing and incoming water. By constructing my heater in the manner described and surrounding the pipe-coils with non-conducting material and by further insulating the coils of the larger pipe from each other by interposing a non-conducting material between its convolutions I reduce the loss of heat by radiation to the minimum and secure a practically perfect exchange of heat from the water in the large pipe-coil to that in the smaller. The water thus enters the vessel H in a highly-heated condition and requires but slight additional heating to raise it to the sterilizing temperature.

Further, by arranging the parts of the apparatus as described it can be manufactured in the most compact form possible in such a device.

Obviously the water from the tank A might pass through the larger pipe-coil, the sterilized water passing through the smaller coil, or a pipe longitudinally divided by a partition may be used, the water flowing in the two parts in opposite directions.

The heating apparatus may also be provided, if found desirable, with a heat-regulator of any preferred construction.

Having thus fully described my invention, what I claim is—

1. In an apparatus for sterilizing water, the combination with a suitable source of water-supply, of a double pipe-coil, a set of vertical tubes communicating with one of such pipe-coils and arranged within but not communicating with a casing having communication with the other of such pipe-coils, and a heating vessel communicating in its lower part with the vertical tubes and in its upper part with the casing containing them, substantially as described.

2. The combination, in a water-sterilizing apparatus, of a double pipe-coil, a series of vertical tubes, a casing inclosing the tubes and heat-insulated from the pipe-coil, said casing being divided into upper and lower non-communicating chambers, the upper chamber communicating with one of such pipe-coils and the lower chamber with the other of such pipe-coils, a chamber arranged in the upper end of the casing and with which the upper ends of the vertical tubes communicate, a water-heater, and connections between the water-heater and the interior of the casing and upper chamber, substantially as described.

3. The combination, in a water-sterilizing apparatus, of a series of vertical tubes, a cylindrical casing inclosing the tubes, two concentric coils of pipe surrounding said casing, one of which is inclosed within the other and has communication with a suitable source of water-supply, non-conducting material inclosing said coils and interposed between the convolutions of the larger pipe-coil, whereby to heat-insulate said coil from the casing and its convolutions from each other, upper and lower non-communicating chambers located in said casing, the upper chamber communicating with the large pipe-coil and the lower chamber with the small pipe-coil, a chamber arranged in the upper end of the casing and with which the upper ends of the vertical tubes communicate, a water-heater, and connections between the water-heater and the interior of the casing and upper chamber, substantially as described.

4. The combination, in a water-sterilizing apparatus, of a series of vertical tubes, a cylindrical casing, formed in two parts, inclosing the tubes and having an apertured cover removably secured thereon, two concentric coils of pipe surrounding said casing, one of which is inclosed within the other and has communication with a suitable source of water-supply, a partition removably secured between the two parts of the casing and forming upper and lower non-communicating chambers, the upper chamber communicating, by means of a removable connection, with the large pipe-coil and the lower chamber, by means of a removable connection with the small pipe-coil, a chamber arranged in the upper end of the casing and with which the upper ends of the vertical tubes communicate, an apertured cover removably secured thereon, a water-heater, and removable connections between the water-heater and the interior of the casing and upper chamber, substantially as described.

5. In a water-sterilizing apparatus, the combination with the pipe-coils, vertical tubes, casing E having upper and lower chambers, and chamber F, as described, of a water-heater comprising an outer cylindrical casing O, a heating vessel contained in said casing and removably supported thereon to form a cover therefor, an apertured cover removably secured to said heating vessel, pipes removably secured to said cover at the apertures, one of which is removably connected with said chamber F and the other with the casing E, a cylinder, open at its upper end, removably secured to the bottom of the casing O, and extending upward between said casing and the vessel H to a point near the top of the former, whereby to form a tortuous passage for the products of combustion, a burner-opening in the bottom of said casing and an outlet-opening in the side for the products of combustion, substantially as described.

In testimony whereof I have signed my name to this specification, in the presence of two subscribing witnesses, this 17th day of March, A. D. 1897.

LOUIS MAICHE.

Witnesses:
JNO. P. M. MILLARD,
W. M. HARRIS.